United States Patent
Fujita et al.

(10) Patent No.: US 9,613,349 B2
(45) Date of Patent: Apr. 4, 2017

(54) MONETARY INFORMATION PROCESSING SERVER AND MONETARY INFORMATION PROCESSING METHOD

(71) Applicant: Sony Corporation, Tokyo (JP)

(72) Inventors: Norihiko Fujita, Tokyo (JP); Kazuki Yamada, Tokyo (JP); Hiroyuki Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/293,570

(22) Filed: Oct. 14, 2016

(65) Prior Publication Data

US 2017/0032355 A1    Feb. 2, 2017

Related U.S. Application Data

(63) Continuation of application No. 11/707,708, filed on Feb. 16, 2007, now Pat. No. 9,483,757.

(51) Int. Cl.
| | |
|---|---|
| *G06K 5/00* | (2006.01) |
| *G06Q 20/32* | (2012.01) |
| *G07F 19/00* | (2006.01) |
| *G06Q 20/40* | (2012.01) |

(52) U.S. Cl.
CPC ..... *G06Q 20/3223* (2013.01); *G06Q 20/3227* (2013.01); *G06Q 20/405* (2013.01); *G07F 19/202* (2013.01)

(58) Field of Classification Search
USPC ....................................................... 235/380
See application file for complete search history.

(56) References Cited

U.S. PATENT DOCUMENTS

| | | | | |
|---|---|---|---|---|
| 4,114,027 A | * | 9/1978 | Slater ................. | G06Q 20/1085 340/5.41 |
| 5,426,281 A | * | 6/1995 | Abecassis ............. | G06Q 20/02 235/379 |
| 7,379,916 B1 | * | 5/2008 | Mizrah .................. | G06Q 20/04 235/379 |

(Continued)

FOREIGN PATENT DOCUMENTS

| | | |
|---|---|---|
| JP | H11-353372 A | 12/1999 |
| JP | 2001-344537 A | 12/2001 |
| JP | 2004-171560 A | 6/2004 |

*Primary Examiner* — Michael G Lee
*Assistant Examiner* — David Tardif
(74) *Attorney, Agent, or Firm* — K&L Gates LLP

(57) ABSTRACT

An object of the present invention is to deposit money to a monetary terminal using an account in a financial institution. When remitting money for charging up a monetary terminal to a center account 31, the user inputs to a banking system 3 remitter information containing a name (in katakana characters) and a monetary terminal ID of the monetary terminal that is to be charged up. In response to this, the banking system 3 transmits a remittance amount and the remitter information to an electronic money server 2. The electronic money server 2 extracts the name of the user and the monetary terminal ID from the received remitter information, and checks them against user registration information. Thereafter, the electronic money server 2 generates amount update information within the remitted amount, and transmits it to a cell phone 7 or an electronic money card 15, which is identified by the monetary terminal ID.

19 Claims, 11 Drawing Sheets

(56) References Cited

U.S. PATENT DOCUMENTS

| | | | | |
|---|---|---|---|---|
| 2003/0208438 A1* | 11/2003 | Rothman | ............... | G06Q 40/02 705/38 |
| 2004/0002910 A1* | 1/2004 | Mizukami | .............. | G06Q 20/04 705/36 R |
| 2004/0049452 A1* | 3/2004 | Blagg | .................... | G06Q 20/04 705/39 |
| 2004/0215564 A1* | 10/2004 | Lawlor | .................. | G06Q 20/04 705/40 |
| 2005/0199709 A1* | 9/2005 | Linlor | .................... | G06Q 20/04 235/380 |
| 2006/0106701 A1* | 5/2006 | Ayala | .................... | G06Q 40/00 705/35 |
| 2006/0144923 A1* | 7/2006 | VanKirk | .............. | G06Q 20/042 235/379 |
| 2007/0063017 A1* | 3/2007 | Chen | ...................... | G06Q 20/02 235/379 |
| 2007/0168265 A1* | 7/2007 | Rosenberger | .......... | G06Q 40/12 705/30 |
| 2007/0260509 A1* | 11/2007 | Hines | ..................... | G06Q 30/02 705/14.27 |
| 2008/0011825 A1* | 1/2008 | Giordano | ............... | G06Q 20/04 235/380 |

* cited by examiner

Fig. 2

```
                                    ABC BANK
REMITTANCE AMOUNT
┌─────────────────────┐
│ ¥ 1 0, 0 0 0        │
└─────────────────────┘
WITHDRAWAL ACCOUNT
┌──────────────────────────────────────────────────────────────┐
│ GOTANDA BRANCH, SAVINGS, ACCOUNT NO. 1234567, YAMADA TARO    │
└──────────────────────────────────────────────────────────────┘
REMITTANCE DESTINATION
┌──────────────────────────────────────────────────────────────────────────────┐
│ IROHA BANK, TAMACHI BRANCH, SAVINGS, ACCOUNT NO. 7654321, ELECTRONIC MONEY CENTER │
└──────────────────────────────────────────────────────────────────────────────┘
REMITTER (KATAKANA/ONE-BYTE ENGLISH CHARACTERS OR NUMERALS)
┌─────────────────────────────┐
│ YAMADA TARO, 12345678       │
└─────────────────────────────┘
                                        ┌─────────┐   ┌─────────┐
                                        │ DEPOSIT │   │ RETURN  │
                                        └─────────┘   └─────────┘
```

Fig. 6

| MONETARY TERMINAL IDS | USER NAMES | REFUND ACCOUNTS | E-MAIL ADDRESSES | . . . |
|---|---|---|---|---|
| 12345678 | YAMADA TARO | 1234567 | abc@mail.co.jp | . . . |
| . . . | . . . | . . . | . . . | . . . |
| . . . | . . . | . . . | . . . | . . . |

Fig. 7

| MONETARY TERMINAL IDS | AMOUNTS | EXPIRATION DATES | CHARGING-UP | ... |
|---|---|---|---|---|
| 12345678 | ¥9,800<br>¥25,000<br>¥25,000 | 2004/7/7<br>2004/7/7<br>2004/7/7 | USED | ...<br>... |
| ... | ... | ... | ... | ... |

Fig. 11

| | |
|---|---|
| RECEIVABLE AMOUNT | ￥1 0 0 0 |
| (EXPIRATION DATES | 2 0 0 4／7／7) |
| CURRENT BALANCE OF VALUE | ￥2 5 0 0 |
| BALANCE AFTER RECEPTION | ￥3 5 0 0 |

EXECUTE   RETURN   CANCEL

MONETARY INFORMATION PROCESSING SERVER AND MONETARY INFORMATION PROCESSING METHOD

CROSS-REFERENCE TO RELATED APPLICATIONS

The present application is a continuation of U.S. application Ser. No. 11/707,708, filed Feb. 16, 2007, the entire contents of which is incorporated by reference herein.

BACKGROUND OF THE INVENTION

Field of the Invention

The present invention relates to a monetary information processing server and a monetary information processing method, which, for example, deposit a sum of money to an electronic money card by remitting the sum to a financial account.

Description of the Related Art

In recent years, settlement systems using electronic money have been introduced to retail shops and department stores, and come into wide use.

The electronic money has a monetary value, called "VALUE", which is equivalent to money and stored to a monetary terminal such as an electronic money card or a cell phone compatible with the electronic money, and the monetary terminal is used as an electronic wallet.

The process of writing the "VALUE" to the monetary terminal is referred to as "charging up", which can be performed using a dedicated terminal device (hereinafter, an "electronic money terminal") installed at a store such as a retail shop, or can be performed from an electronic money server via the Internet.

Settlement by the monetary terminal is performed by subtracting a payment amount from the "VALUE" stored in the monetary terminal, and as in the case of charging up, the settlement can be performed using the electronic money terminal or the electronic money server.

An invention that uses the electronic money in a manner as described above is disclosed by the present applicant in unpublished Patent Application No. 2003-61943.

In this invention, a cell phone provided with an Internet connection function and an electronic money function accesses the electronic money server, and charges itself up with electronic money while communicating with the electronic money server.

This invention allows the user to perform the charging-up, for example, without being restricted to any physical locations and business hours.

When charging up the monetary terminal, the user is required to pay an amount of money for the charging-up to an electronic money center in order to associate "VALUE" with actual money.

For performing the charging-up from the electronic money terminal, the user pays money to a clerk at a retail shop or the like, whereas for performing the charging-up from the electronic money server via the Internet, the user pays money using a credit card previously registered with the electronic money center.

However, there might be some users who wish to perform the charging-up by way of the Internet but do not have a credit card, and therefore, in order to allow the electronic money to be used more generally, it is necessary to provide means for performing the charging-up that can be readily used by more users.

SUMMARY OF THE INVENTION

Therefore, an object of the present invention is to allow money to be deposited to the monetary terminal using an account in a financial institution.

To achieve the above object, a first aspect of the present invention is directed to a monetary information processing server for transmitting amount update information to a monetary terminal for increasing/decreasing an amount of a monetary value based on the amount update information, the monetary value being stored in the monetary terminal, the server including: an amount acquisition section for acquiring from a banking system an amount remitted to a predetermined financial account and monetary terminal identification information specified at a time of the remittance; an amount update information transmission section for transmitting amount update information for increasing a monetary value by a predetermined amount so as not to exceed a range of the remitted amount to a monetary terminal identified by the acquired monetary terminal identification information; and an amount decrease section for decreasing the amount acquired from the banking system by an amount that is to be added based on the amount update information.

In a second aspect of the present invention, based on the first aspect, the monetary information processing server further includes an amount reception section for receiving an amount of a monetary value stored in the monetary terminal identified by the monetary terminal identification information from the same monetary terminal, and the amount update information transmission section transmits amount update information within a range not exceeding an amount limit previously set for the monetary terminal based on the received amount.

In a third aspect of the present invention, based on the first or second aspect, the monetary information processing server further includes a division section for, when the amount acquired from the banking system is beyond a predetermined amount, dividing the acquired amount into unit amounts, and the amount update information transmission section transmits amount update information for adding a unit amount obtained by dividing the acquired amount.

In a fourth aspect of the present invention, based on the first, second, or third aspect, the monetary information processing server further includes a transmission preparation completion notice transmission section for, when preparation for transmitting the amount update information is completed, transmitting a transmission preparation completion notice to a destination associated with the monetary terminal.

In a fifth aspect of the present invention, based on any one of the first through fourth aspects, the monetary information processing server further includes an amount accumulation section for accumulating an amount acquired by the amount acquisition section for each monetary terminal identified by the monetary terminal identification information, and the amount decrease section decreases the accumulated amount for each monetary terminal having transmitted amount update information.

In a sixth aspect of the present invention, based on any one of the first through fifth aspects, the monetary terminal identification information is information that, along with an amount, has been inputted to the banking system by a remitter.

A seventh aspect of the present invention is directed to a monetary information processing method for use in a computer having an amount acquisition section, an amount update information transmission section, and an amount decrease section, the computer transmitting amount update information to a monetary terminal for increasing/decreasing an amount of a monetary value based on the amount update information, the monetary value being stored in the monetary terminal, the method including: an amount acquisition step performed by the amount acquisition section for acquiring from a banking system an amount remitted to a predetermined financial account and monetary terminal identification information specified at a time of the remittance; an amount update information transmission step performed by the amount update information transmission section for transmitting amount update information for increasing a monetary value by a predetermined amount so as not to exceed a range of the remitted amount to a monetary terminal identified by the acquired monetary terminal identification information; and an amount decrease step performed by the amount decrease section for decreasing the amount acquired from the banking system by an amount that is to be added based on the amount update information.

According to the present invention, it is possible to deposit money to a monetary terminal using an account in a financial institution.

BRIEF DESCRIPTION OF THE DRAWINGS

FIG. 2 is a diagram illustrating an exemplary remittance screen.

FIG. 6 is a table illustrating a logical configuration of user registration information.

FIG. 7 is a table illustrating a logical configuration of remittance amount information.

FIG. 11 is a diagram illustrating an exemplary charge-up screen.

Figure 1:
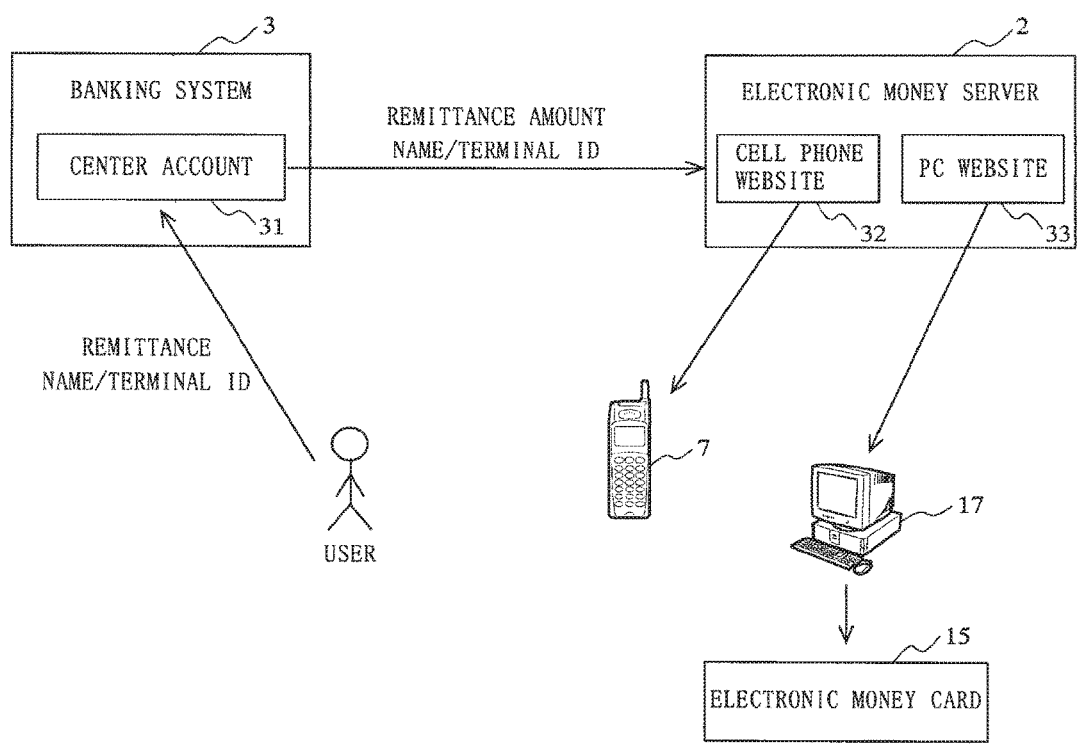
FIG. 1 is a diagram for explaining the basic configuration of an embodiment of the present invention.

DESCRIPTION OF THE PREFERRED EMBODIMENTS (1) Basic Configuration of an Embodiment Hereinafter, the basic configuration of an embodiment will be described with reference to FIG. 1.

A banking system 3 is an online system of a bank, which accepts access from users to ATM (Automatic Teller Machine) terminals and websites on the Internet and allows money to be deposited to or withdrawn/remitted from the users' accounts.

The electronic money center is a business entity that manages circulation of electronic money, and has a center account 31 open in a bank in order to accept deposit of money with which to charge up monetary terminals.

The user remits money with which to charge up the monetary terminal to the center account 31.

When remitting the money, the user who is the remitter inputs to the banking system 3 his/her name (in katakana characters) and a monetary terminal ID of the monetary terminal that is to be charged up.

Here, the monetary terminal ID constitutes monetary terminal identification information for identifying the monetary terminal.

Note that the banking system 3 is also capable of accepting remittances from other banks and financial institutions to the center account 31.

FIG. 2 illustrates an exemplary remittance screen. The remittance screen is displayed on an ATM terminal.

In the case of accessing the banking system 3 via the Internet to make a remittance from a terminal device such as a PC (personal computer), a similar screen is displayed on the display of the PC.

The remittance screen presents fields such as "remittance amount", "withdrawal account", "remittance destination" and "remitter", and the user fills in these fields.

The "remittance amount" field is filled in with an amount that is to be remitted to the center account 31, i.e., an amount of money with which to charge up the monetary terminal. This amount can be entered using unillustrated numeric keys.

The "withdrawal account" field is filled in with information, such as the user's account number, which identifies a financial account from which the money with which to charge up the monetary terminal is provided.

Note that it is possible that the banking system 3 may automatically fill in the field, for example, using the user's cash card data (in the case of an ATM terminal) or the user's authentication information (in the case of a website).

In the example of FIG. 2, Gotanda branch of ABC bank is designated as the bank where the withdrawal account is held, and the withdrawal account is a savings account identified by account number 1234567. The account holder is shown as "YAMADA, Taro". In such a manner, on the banking system 3, names/denominations of account holders are displayed in katakana characters.

The "remittance destination" field is filled in with information for identifying the center account 31.

In the example of the figure, the center account 31 is a savings account with account number 7654321 at Tamachi branch of Iroha bank. The account holder is "electronic money center".

This field is filled in by the user, who is prompted to enter the first letter of the name for each of the bank and the branch to narrow down options to the specific branch, and thereafter enter the account number of the center account 31 using numeric keys.

The "remitter" filed is filled in with remitter information including the name of the user and a monetary terminal ID, which are entered in this order without putting a space between them. This field can be filled in by using unillustrated character and numeric keys.

As will be described later, the user has previously registered the monetary terminal ID of the monetary terminal, his/her name, etc., with the electronic money center, and therefore the user enters values registered with the electronic money center in the "remitter" field. Note that the remitter information is used later by the electronic money server 2 for identifying the monetary terminal that is to be charged up, and the remitter information constitutes monetary terminal identification information for identifying the monetary terminal that is to be charged up.

The remittance screen is further provided with a deposit button and a return button, and the user selects the deposit button to validate the entries or the return button to correct the entries.

These buttons are each selected by, in the case of an ATM, gently touching a portion where the button is displayed (the ATM screen is assumed to be composed of a touch panel), whereas in the case of a PC, the selection is made by, for example, clicking on the button with a mouse.

When the deposit button is selected, the banking system 3 remits the money deposited by the user to the center account 31.

Referring back to FIG. 1, when the money is remitted to the center account 31, the banking system 3 transmits the remittance amount and the remitter information (the name of the user and the monetary terminal ID) to the electronic money server 2.

Upon receipt of these pieces of information from the banking system 3, the electronic money server 2 extracts the name of the user and the monetary terminal ID from the remitter information.

Then, the electronic money server 2 checks (matches) them against the name of the user (in katakana characters) and the monetary terminal ID that are contained in previously registered user registration information, and if the two combinations are identical, the electronic money server 2 confirms that the remittance has been made by the user himself/herself.

The electronic money server 2 has stored therein the user registration information containing the monetary terminal ID in association with an electronic mail address.

Upon confirmation that the remittance has been made by the user himself/herself, the electronic money server 2 transmits notification mail, which notifies that preparation for charging up the monetary terminal has been completed, to the electronic mail address registered by the user.

Here, the notification mail constitutes a transmission preparation completion notice that notifies the user that the preparation for charging-up has been completed (the preparation for transmitting amount update information as described later has been completed).

The following description of the present embodiment is given on the assumption that the cell phone 7 and the electronic money card 15 are used as monetary terminals.

As will be described in detail below, each of the cell phone 7 and the electronic money card 15 has stored therein a monetary value in the form of information called "VALUE", and each of them is embedded with an IC chip having a function of increasing/decreasing the amount of "VALUE".

First, in the case where the monetary terminal designated as a target for charging-up by the user is the cell phone 7, the user normally has already registered an electronic mail address for the cell phone 7.

Therefore, the user receives notification mail on the cell phone 7, and after checking the mail, the user connects the cell phone 7 to a cell phone website 32.

After the user is authenticated at the cell phone website 32 based on a user ID, a password, etc., the user requests the electronic money server 2 for charging-up.

In response to this, the electronic money server 2 generates amount update information within the range of the remitted amount, and transmits it to the cell phone 7.

The cell phone 7 updates the amount of stored "VALUE" to an amount after the charging-up based on the amount update information.

On the other hand, in the case where the monetary terminal designated as a target for charging-up by the user is the electronic money card 15, the user charges it up with "VALUE" via the PC 17.

The PC 17 includes, as a peripheral device, an unillustrated relay called a "reader/writer" (which will be described below), and is capable of communicating with the electronic money card 15 via the reader/writer.

The user checks the notification mail on the PC 17 or another terminal device, and thereafter places the electronic money card 15 in the reader/writer to connect the PC 17 to a PC website 33.

Then, after user authentication by the electronic money server 2 is completed, the user requests the electronic money server 2 for charging up with "VALUE".

In response to this, the electronic money server 2 generates amount update information within the range of the remitted amount, and transmits it to the PC 17.

The PC 17 receives the amount update information from the electronic money server 2, and inputs it to the electronic money card 15.

The electronic money card 15 updates the amount of stored "VALUE" to an amount after the charging-up based on the amount update information.

Thus, by remitting money to a financial account designated by the electronic money center and inputting an ID of a monetary terminal that is to be charged up, the user can charge up the monetary terminal identified by the monetary terminal ID with "VALUE" using the remitted money.

In addition, the center account 31 can receive money remitted from any financial institutions, such as city banks, regional banks, long-term trust banks, Internet banks, deposit unions, worker's deposit unions and postal savings banks, without limiting financial institutions from which to make a remittance to any specific type, and therefore it is possible to provide abundant opportunities for the users to deposit money.

(2) Overall Configuration of the Present Embodiment

The overall configuration of the present embodiment will now be described with reference to FIG. 3.

Figure 3:
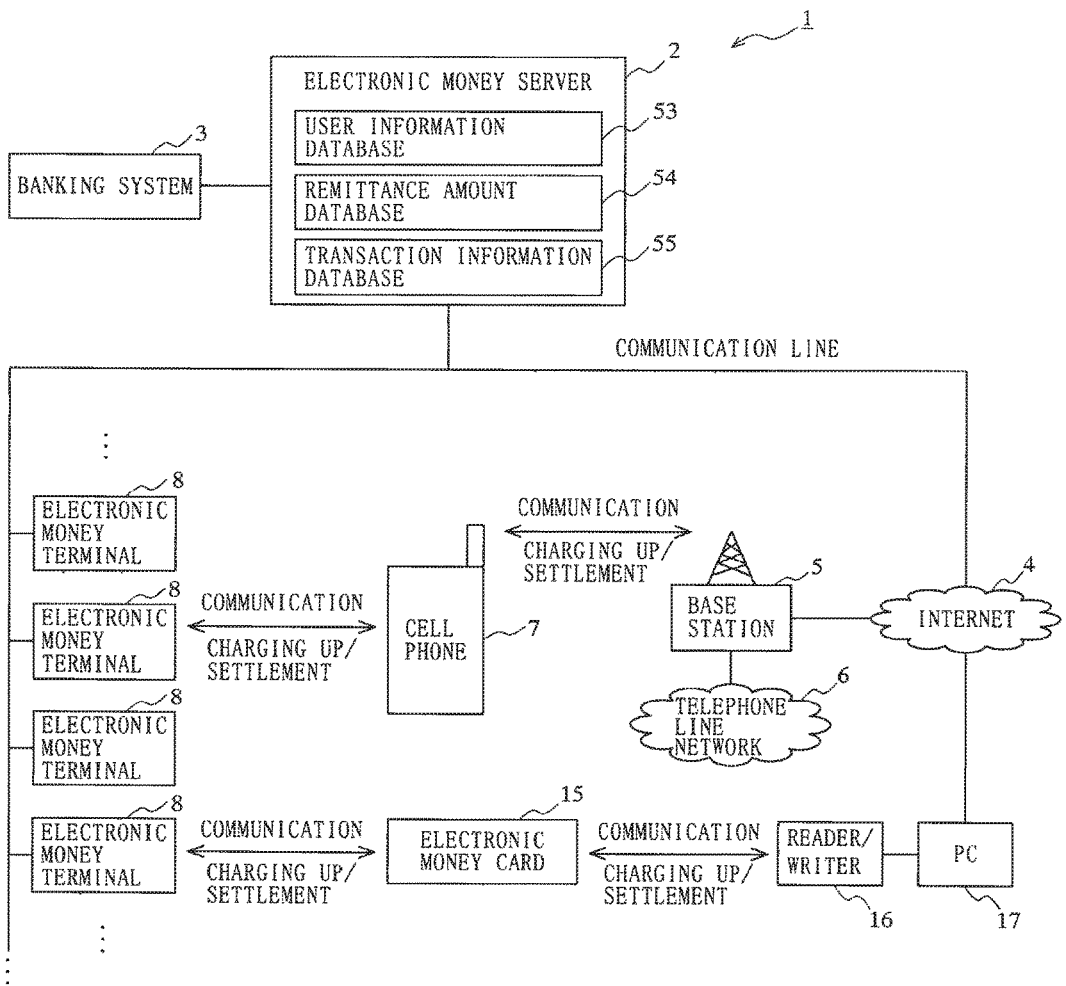
FIG. 3 is a diagram for explaining the overall configuration of the embodiment.

The electronic money system 1 shown in FIG. 3 includes the banking system 3, the electronic money server 2, the Internet 4, a base station 5, a telephone line network 6, the cell phone 7, the electronic money card 15, the electronic money terminals 8, 8, 8, . . . , the PC 17, and the reader/writer 16.

The electronic money terminal 8 is a terminal device provided at a shop or the like for accessing a contactless-type IC card and exclusively configured for electronic money business.

The electronic money terminal 8 includes a reader/writer portion including an antenna, and is capable of transmitting/receiving electric waves by the antenna to perform short-range wireless communication with contactless-type IC chips embedded in monetary terminals such as the electronic money card 15 and the cell phone 7.

By wirelessly communicating with the monetary terminals, the electronic money terminal 8 can read monetary terminal IDs assigned to the monetary terminals and balances of "VALUE" stored in the monetary terminals, and also can input amount update information to the monetary terminals to increase/decrease the amount of "VALUE".

Here, the amount update information is information for increasing/decreasing the amount of "VALUE" stored in the monetary terminal by a predetermined amount, and specific examples thereof are given below.

In the case of performing a process for adding/subtracting "VALUE" to/from the monetary terminal, the amount update information acts as a command for the monetary terminal to add/subtract a designated amount of "VALUE". The monetary terminal executes the command to add/subtract the designated amount to/from the amount of "VALUE".

In the case of performing a process to add/subtract "VALUE" using a device external to the monetary terminal, e.g., the electronic money terminal 8 or the electronic money server 2, the amount update information indicates an amount after the addition/subtraction process.

In such a case, the external device acquires an amount of currently stored "VALUE" from the monetary terminal, and adds/subtracts a predetermined amount thereto/therefrom to input an amount after the addition/subtraction to the monetary terminal.

The monetary terminal alters the amount of "VALUE" based on the inputted amount.

While two approaches about the amount update information have been described above, they can be used in combination.

For example, the addition process may be performed outside the monetary terminal, and an amount after the process may be inputted to the monetary terminal, so that the monetary terminal can alter the amount of "VALUE" to the inputted amount. As for the subtraction process, a subtraction command may be inputted to the monetary terminal so that the subtraction process is performed by the monetary terminal.

The electronic money terminal 8 is capable of increasing/decreasing the "VALUE" stored in the monetary terminal in the above manner. Therefore, when charging up the monetary terminal, a sum of money equivalent to an amount used for charging-up is collected from the user, and instead of collecting a payment for merchandize or a service from the user, the payment can be settled by decreasing "VALUE" in the monetary terminal, thereby circulating the "VALUE" in place of cash.

In addition, the electronic money terminal 8 is provided so as to be connectable to the electronic money server 2 via a communication line, and the electronic money terminal 8 accumulates log data containing a record of the details of communication with the electronic money card 15, and transmits the log data approximately once a day to the electronic money server 2 by batch processing.

The log data contains information such as the monetary terminal ID of the monetary terminal that has processed "VALUE", the amount used for charging-up, the settlement amount, the process date and time, the ID of the electronic money terminal 8 that has processed the settlement, and the electronic money server 2 is able to summarize the usage and balance of "VALUE" for each monetary terminal based on the log data.

Figure 4:
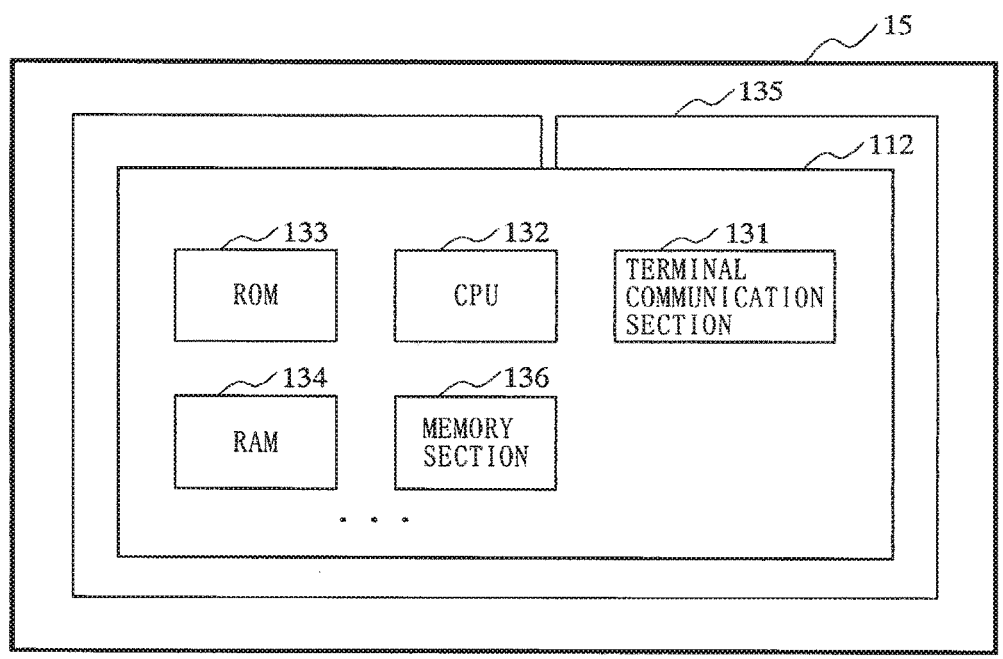
FIG. 4 is a diagram illustrating a configuration of an electronic money card.

The electronic money card 15 is a monetary terminal for storing "VALUE" (a monetary value) and increasing/decreasing the amount of "VALUE" based on the amount update information, and as shown in FIG. 4, the electronic money card 15 is composed of card-shaped synthetic resin having embedded therein an IC chip 112 and a terminal antenna 135 connected thereto.

The terminal antenna 135 has a function of generating power with electric waves emitted by the electronic money terminal 8 or the below-described reader/writer 16 to supply power to the IC chip 112 and a function of performing short-range wireless communication with the electronic money terminal 8 and the reader/writer 16.

In addition, the monetary terminal ID stored in the IC chip 112 is printed on the surface of the electronic money card 15, so that the user can input the monetary terminal ID to the banking system 3 by referring to the indication.

The IC chip 112 is a contactless-type IC chip on which a CPU 132, a ROM 133, a RAM 134, a memory section 136, a terminal communication section 131, etc., are formed.

The CPU (Central Processing Unit) 132 is a central processor for executing a VALUE processing program stored in the memory section 136 to cause the electronic money card 15 to carry out an electronic money processing function.

Thus, the CPU 132 performs processes for outputting the balance of "VALUE" and the monetary terminal ID to the electronic money terminal 8, etc., and receiving the amount update information from the electronic money terminal 8, etc., to update the amount of stored "VALUE".

The memory section 136 is a readable/writable memory for storing a variety of types of programs and data. The information stored in the memory section 136 can be held even if no power is provided to the IC chip 112, and is composed of, for example, an EEPROM (Electrically Erasable and Programmable ROM).

The programs stored in the memory section 136 include a VALUE processing program and an OS (Operating System), which is a basic program for causing the IC chip 112 to function.

In addition, the data stored in the memory section 136 includes the monetary terminal ID, the current balance of "VALUE" and communication log data.

The ROM (Read Only Memory) 133 is a read-only memory having stored therein programs and data that are essential to allow the IC chip 112 to function.

The RAM (Random Access Memory) 134 is a readable/writable memory for providing working memory for the CPU 132 to carry out the VALUE processing function.

In addition, the terminal communication section 131 is an interface connected to the terminal antenna 135 to communicate with the electronic money terminal 8 and the reader/writer 16.

Referring back to FIG. 3, the PC 17 is a terminal device composed of a personal computer connectable to the Internet 4.

The PC 17 is connected to the reader/writer 16 as a peripheral device. Similar to the electronic money terminal 8, the reader/writer 16 includes an antenna for communicating with the terminal antenna 135 of the electronic money card 15, so that the PC 17 can perform short-range wireless communication with the electronic money card 15 via the reader/writer 16.

Therefore, by placing the electronic money card 15 in the reader/writer 16 and connecting the PC 17 to the electronic money server 2, it is made possible for the electronic money server 2 to communicate with the electronic money card 15 via the PC 17 and the reader/writer 16.

By communicating with the electronic money card 15 in this manner, the electronic money server 2 can acquire the current balance of "VALUE" and the monetary terminal ID from the electronic money card 15, or it can transmit the amount update information to the electronic money card 15 to charge up the electronic money card 15 with "VALUE" or subtract "VALUE" to make a settlement.

In addition to the function as a phone, the cell phone 7 has a function of connecting to the Internet, and furthermore, the cell phone 7 is embedded with a contactless-type IC chip similar to the IC chip 112 of the electronic money card 15.

Although not shown, the cell phone 7 includes a display and a loudspeaker as output means, and also includes input means such as a microphone, character keys, numeric keys, and operating keys for performing various operations.

Figure 5:
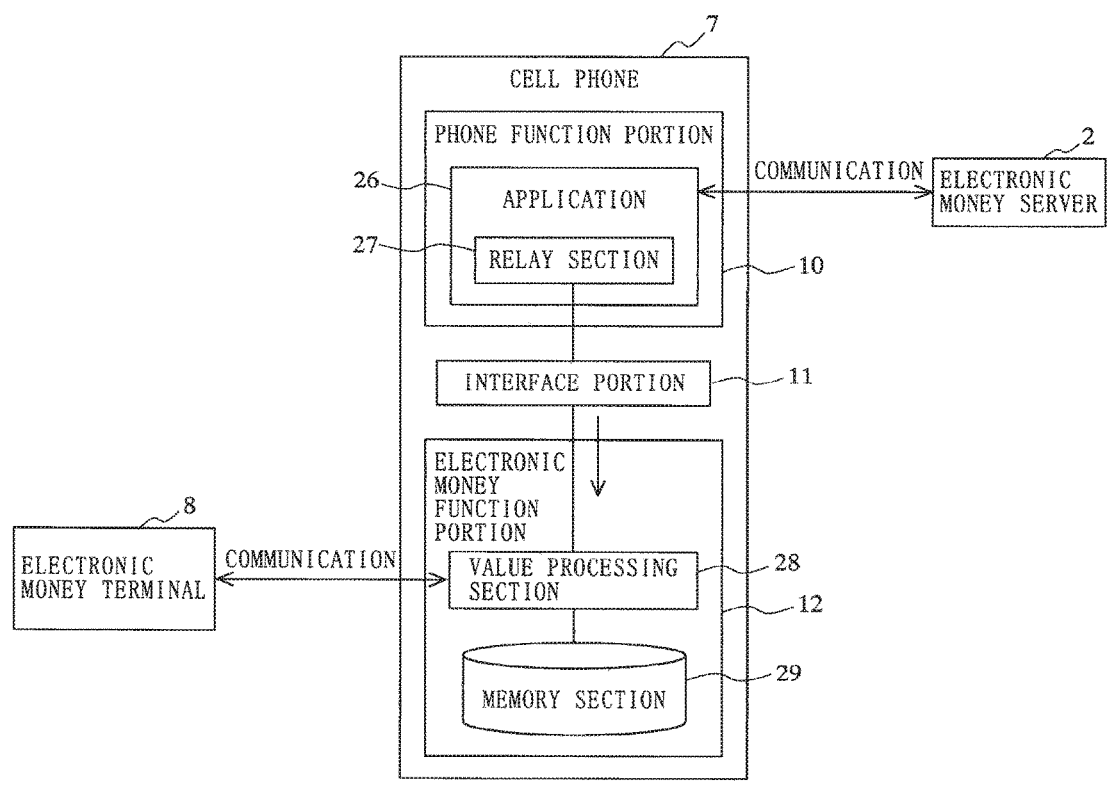
FIG. 5 is a diagram illustrating a configuration of a cell phone.

FIG. 5 is a block diagram illustrating the functional configuration of the cell phone 7. As shown in FIG. 5, the cell phone 7 includes a phone function portion 10 for carrying out the function as an Internet-connectable cell phone, an electronic money function portion 12 composed of a contactless IC chip for carrying out the electronic money processing function, and an interface portion 11 for connecting these two portions.

Because of the electronic money function portion 12, the cell phone 7 is able to carry out the electronic money processing function in a manner similar to the electronic money card 15, and constitutes a monetary terminal.

The phone function portion 10 is capable of wireless communication with the base station 5 (FIG. 3), and connecting via the base station 5 to the telephone line, network 6 (to make a call) and the Internet 4 (to access the electronic money server 2).

The phone function portion 10 has an application 26 installed therein. The application 26 is an application for providing various services related to the electronic money, and includes a relay section 27 for accessing the electronic money function portion 12 via the interface portion 11.

The application 26 has a function for presenting information stored in the electronic money function portion 12 to the user, e.g., the application 26 accesses the electronic money function portion 12 to display the monetary terminal ID, the balance of "VALUE", log data, etc., on the display. The user can input the monetary terminal ID to the banking system 3 based on the displayed information.

Furthermore, the application 26 communicates with the electronic money server 2 via the Internet 4.

Thus, the monetary terminal ID, the balance of "VALUE", etc., that are stored in the electronic money function portion 12 can be transmitted to the electronic money server 2, and amount update information transmitted from the electronic money server 2 can be inputted to the electronic money function portion 12.

Although not shown, the electronic money function portion 12 is composed of a terminal antenna and a contactless-type IC chip on which elements such as a CPU, a ROM, a RAM, a memory section and a terminal communication section are formed as in the electronic money card 15, and the CPU executes the VALUE processing program to form a VALUE processing section 28 shown in FIG. 5.

The memory section 29 is composed of, for example, an EEPROM, and has stored therein the monetary terminal ID, the balance of "VALUE", log data, etc.

The VALUE processing section 28 outputs the monetary terminal ID and the balance of "VALUE" in accordance with an instruction from an outside communication destination or receives the amount update information from an outside communication destination to update the balance of "VALUE".

The electronic money terminal 8 and the electronic money server 2 can be communication destinations of the VALUE processing section 28.

In the case of communicating with the electronic money terminal 8, the VALUE processing section 28 performs wireless communication via the terminal antenna included therein. In this case, the user places the cell phone 7 near the electronic money terminal 8 as in the case of the electronic money card 15.

In the case of communicating with the electronic money server 2, the VALUE processing section 28 communicates via the application 26 with the electronic money server 2 on the Internet 4.

By communicating with the electronic money terminal 8 or the electronic money server 2 to input the amount update information to the electronic money function portion 12 in the above manner, the cell phone 7 can charge up the electronic money function portion 12 with "VALUE" or make a settlement by "VALUE" in the electronic money function portion 12.

Referring back to FIG. 3, the electronic money server 2 is a monetary information processing server for managing circulation of "VALUE". The electronic money server 2 connects to the Internet 4, the electronic money terminals 8, 8, 8, . . . , and the banking system 3 via a communication line.

The electronic money server 2 carries out various functions such as a website operation function, a user registration function, a remitted money processing function and a transaction processing function.

In addition, in order to carry out these functions, the electronic money server 2 includes a user information database 53, a remittance amount database 54, a transaction information database 55, and various other databases.

[Website Operation Function]

The electronic money server 2 operates websites related to electronic money services on the Internet 4, and the websites include the cell phone website 32 for cell phones 7 and the PC website 33 as shown in FIG. 1.

[User Registration Function]

The electronic money server 2 registers users of the monetary terminals with the user information database 53. In addition to the initial registration of the users, the electronic money server 2 also performs deregistration, alteration of registration details, etc., to manage user registration information.

FIG. 6 illustrates a logical configuration of user registration information recorded in the user information database 53.

The user registration information is composed of items such as "monetary terminal IDs", "user names", "refund accounts" and "e-mail addresses".

The "monetary terminal IDs" are monetary terminal IDs of monetary terminals owned by users, and the "user names" are names of the users in katakana characters.

The "refund accounts" are pieces of information specifying financial accounts to which a refund is made in the case where money remitted to the center account 31 by the users is refunded for some reason, and the "e-mail addresses" are destinations to which notification mail is transmitted.

The reason why the names of the users are registered in katakana characters herein is that they are compared to names transmitted from the banking system 3 (which are normally represented in katakana characters).

In addition to these pieces of information, the user registration information contains personal information of the users, such as the dates of registration, the dates of birth, phone numbers and user names represented in Chinese characters, and authentication information such as user IDs and passwords.

The authentication information is used by the users logging in to the cell phone website 32 and the PC website 33.

[Remitted money processing function]

The electronic money server 2 temporarily holds a sum of money remitted to the center account 31, and charges up the monetary terminal with the held money upon request from the user.

This function is further divided into a remittance amount reception function, a remittance amount storage function, and a charging-up function.

[Remittance Amount Reception Function]

The electronic money server 2 accesses the banking system 3 on a regular basis, and receives remitter information and a remittance amount of money remitted to the center account 31 after the last access but before the current access (pull-based information distribution).

Alternatively, when the center account 31 receives any remittance, a remittance amount and remitter information may be automatically transmitted from the banking system 3 to the electronic money server 2 (push-based information distribution).

[Remittance Amount Storage Function]

When the electronic money server 2 receives the remittance amount and the remitter information from the banking system 3, the electronic money server 2 extracts the name of the user represented in katakana characters and the monetary terminal ID from the remitter information.

Then, the extracted name and ID are checked against combinations of monetary terminal IDs and user names represented in katakana characters that are registered with the user registration information 54, and if there is a match, the user and the monetary terminal are identified.

After the user is identified, the amount of remitted money is recorded to the remittance amount database 54.

FIG. 7 illustrates a logical configuration of remittance amount information recorded in the remittance amount database 54.

The remittance amount information is composed of "monetary terminal IDs", "amounts", "expiration dates", "charging-up", and other items.

The "monetary terminal IDs" are monetary terminal IDs extracted from remitter information, and remittance amount data indicates remittance amounts transmitted from the banking system 3.

Thus, the electronic money server 2 can manage the amount of money remitted to the center account 31 in such a manner as to classify them by monetary terminal ID.

Therefore, when money is remitted to the center account 31 a plurality of number of times for the same monetary terminal ID, the money is accumulated.

In addition, there is no upper limit to the amount of money that is to be accumulated in the remittance amount database 54.

Here, the remittance amount database 54 constitutes an amount accumulation section for accumulating the amount of money remitted to the center account 31 for each monetary terminal, and the electronic money server 2 decreases the accumulated amount for each monetary terminal having received amount update information.

Note that in the present embodiment, when a remittance amount is equal to or more than a predetermined amount (e.g., 125,000), the remittance amount is divided (broken) into unit amounts (e.g., 125,000), each of which is set as a charge-up unit, i.e., a unit of amount that can be used per charging-up. In addition, when the remittance amount is less than 125,000, that amount is set as a charge-up unit.

The reason why the charge-up unit is set in this manner is that there is an amount limit to the balance of "VALUE" that can be stored in the monetary terminal (e.g., 150,000), and the purpose thereof is to prevent the amount limit from being exceeded by a single event of charging-up.

In the example of FIG. 7, 159,800 is remitted for the monetary terminal ID "12345678", and divided into three charge-up units: two units of "125,000" and a fraction of "19,800".

The "expiration dates" are time limits up to which the remitted money can be used for charging-up, and a time period for which the remitted money can be used is set to, for example, 90 days. When that time period is passed, the money is refunded to a refund account designated by user registration information.

The "charging-up" is flag information for distinguishing charge-up units stored in the remittance amount database 54 into two types: used and unused for charging up the monetary terminal.

In the example of FIG. 7, the fraction of 19,800 of the divided amount has already been used for charging up the monetary terminal with monetary terminal ID "12345678".

Although not shown, the remittance amount database 54 also contains flag information for identifying charge-up units that have already been refunded to refund accounts, for example, because their expiration dates have passed.

[Charging-Up Function]

When a monetary terminal registers a charge-up unit with the remittance amount database 54, the electronic money server 2 (FIG. 3) retrieves an electronic mail address associated with the ID of the monetary terminal having performed the registration from the user information database 53, and transmits notification mail to the electronic mail address.

Thereafter, for example, when the user requests charging-up with "VALUE" after viewing the notification mail, the electronic money server 2 transmits amount update information to the monetary terminal to charge up the monetary terminal with "VALUE".

The procedure for charging up with "VALUE" will be described in detail later with reference to a flowchart.

[Transaction processing function]

The electronic money server 2 collects log data concerning transactions by "VALUE" for each monetary terminal, and records the collected data to the transaction information database 55.

The log data is transmitted from the electronic money terminals 8 by batch processing, or generated and recorded when charging-up of a monetary terminal or a settlement is performed via the Internet 4.

Next, a hardware configuration of the electronic money server 2 is described with reference to FIG. 8.

Figure 8:
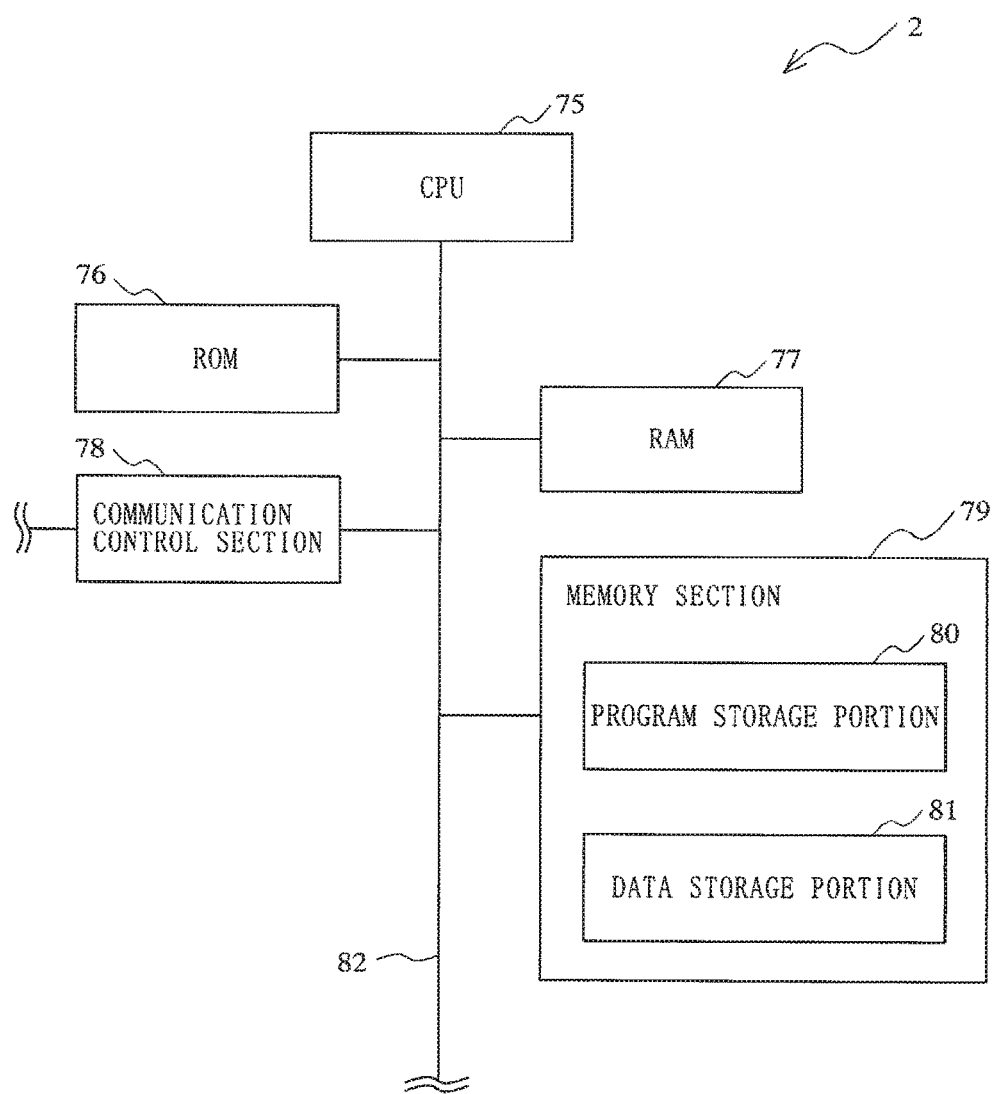
FIG. 8 is a diagram illustrating a configuration of an electronic money server.

As shown in FIG. 8, the electronic money server 2 includes a CPU 75, a ROM 76, a RAM 77, a communication control section 78, a memory section 79, etc., which are connected by a path line 82.

The CPU 75 performs information processing in accordance with predetermined programs, and controls the entire electronic money server 2.

The ROM 76 is a read-only memory having stored therein programs and parameters that are essential to the operation of the electronic money server 2.

The RAM 77 is a readable/writable memory, which provides working memory for the CPU 75, and loads and stores programs and data stored in the memory section 79.

The communication control section 78 is a functional portion for communicating with the cell phone 7 via the Internet 4 and the base station 5, and communicating with the electronic money terminal 8 via the communication line.

The CPU 75 is capable of receiving information concerning transactions by the electronic money card 15 and the cell phone 7 from the electronic money terminal 8 via the communication control section 78, and also capable of communication for charging up the cell phone 7 and the electronic money card 15 or making a settlement.

The memory section 79 is composed of, for example, a hard disk or another type of nonvolatile memory, and includes a program storage portion 80 having various programs stored therein, and a data storage portion 81 having data stored therein.

The program storage portion 80 has stored therein, for example, an OS, which is a basic program for causing the electronic money server 2 to function, and an administering program for causing the electronic money server 2 to administer the electronic money system 1.

The administering program is executed by the CPU 75 for carrying out each of the above-described functions.

In addition, the data storage portion 81 has formed therein the user information database 53, the remittance amount database 54, the transaction information database 55 and other databases as shown in FIG. 3.

Described next is the procedure for, in the electronic money system 1 as described above, charging up the monetary terminal with money remitted to the center account 31.

Figure 9:
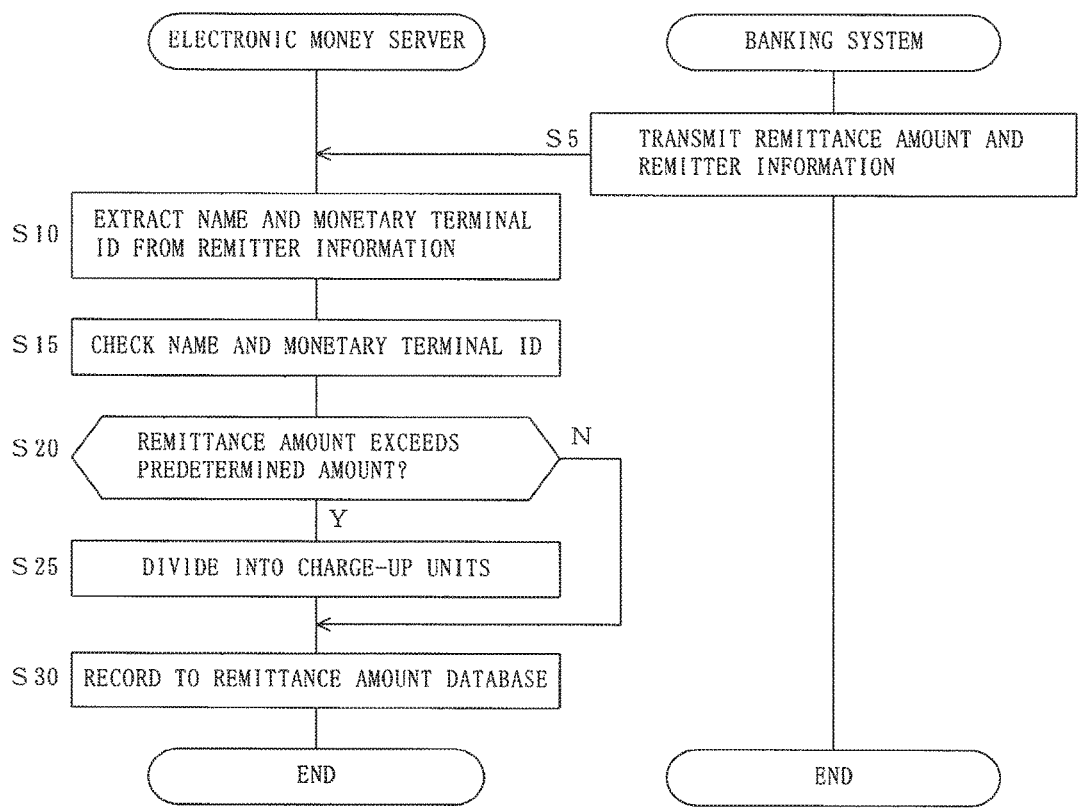
FIG. 9 is a flowchart for explaining a procedure for registering a remittance amount and remitter information.

FIG. 9 is a flowchart for explaining the processing procedure from bank remittance to the center account 31 by the user to recording of information concerning the remittance to the remittance amount database 54.

First, the user remits money to the center account 31 from an ATM or a website of a financial institution.

At this time, the user inputs remitter information by entering his/her name in katakana characters and then a monetary terminal ID of a monetary terminal that is desired to be charged up.

When the remittance is made to the center account 31, the banking system 3 transmits the remittance amount and the remitter information to the electronic money server 2 (step 5). This may be performed by pull-based information distribution or push-based information distribution.

The electronic money server 2 receives the remittance amount and the remitter information from the banking system 3, and separately extracts the remitter name in katakana characters and the monetary terminal ID from the remitter information (step 10).

As such, the electronic money server 2 includes an amount acquisition section for acquiring an amount remitted to the center account 31 and an ID of a monetary terminal as a remittance destination from the banking system 3.

Next, the electronic money server 2 checks a combination of the extracted requester name in katakana characters and monetary terminal ID against combinations of user names in katakana characters and monetary terminal IDs that are registered with the user information database 53 (step 15).

When one or both of the name in katakana characters and the monetary terminal ID do not have a match, the electronic money server 2 returns money to the financial account from which the user has transferred the money.

Note that the electronic money server 2 deducts a fee required for refund from the amount of refund. That is, the refund fee is paid by the user. In addition, if the amount of refund is less than the fee, no refund is made.

The user may be previously notified in a contact clause or the like that, for example, expenses incurred in relation to the refund are paid by the user.

On the other hand, when the combination of the name in katakana characters and the monetary terminal ID has a match, the electronic money server 2 can confirm that the remittance has been made by a valid user and identify the monetary terminal ID of the monetary terminal that is to be charged up.

Next, the electronic money server 2 determines whether the remittance amount exceeds a predetermined amount (e.g., 125,000) (step 20).

When the remittance amount is equal to or less than the predetermined amount (N in step 20), the electronic money server 2 records the remittance amount as a charge-up unit to the remittance amount database 54 (step 30). At this time, an expiration date is set.

When the remittance amount is more than the predetermined amount (Y in step 20), the electronic money server 2 divides the remittance amount into charge-up units, each equal to or less than the predetermined amount (step 25). Then, the pieces of the divided remittance amount are recorded to the remittance amount database 54 along with the expiration date (step 30).

As such, the electronic money server 2 includes a division section for, when an amount acquired from the banking system 3 exceeds a predetermined amount, dividing the acquired amount into unit amounts.

Thus, the electronic money server 2 is capable of storing the amount remitted to the center account 31 as a charging-up amount, thereby completing preparation for charging-up.

Figure 10:
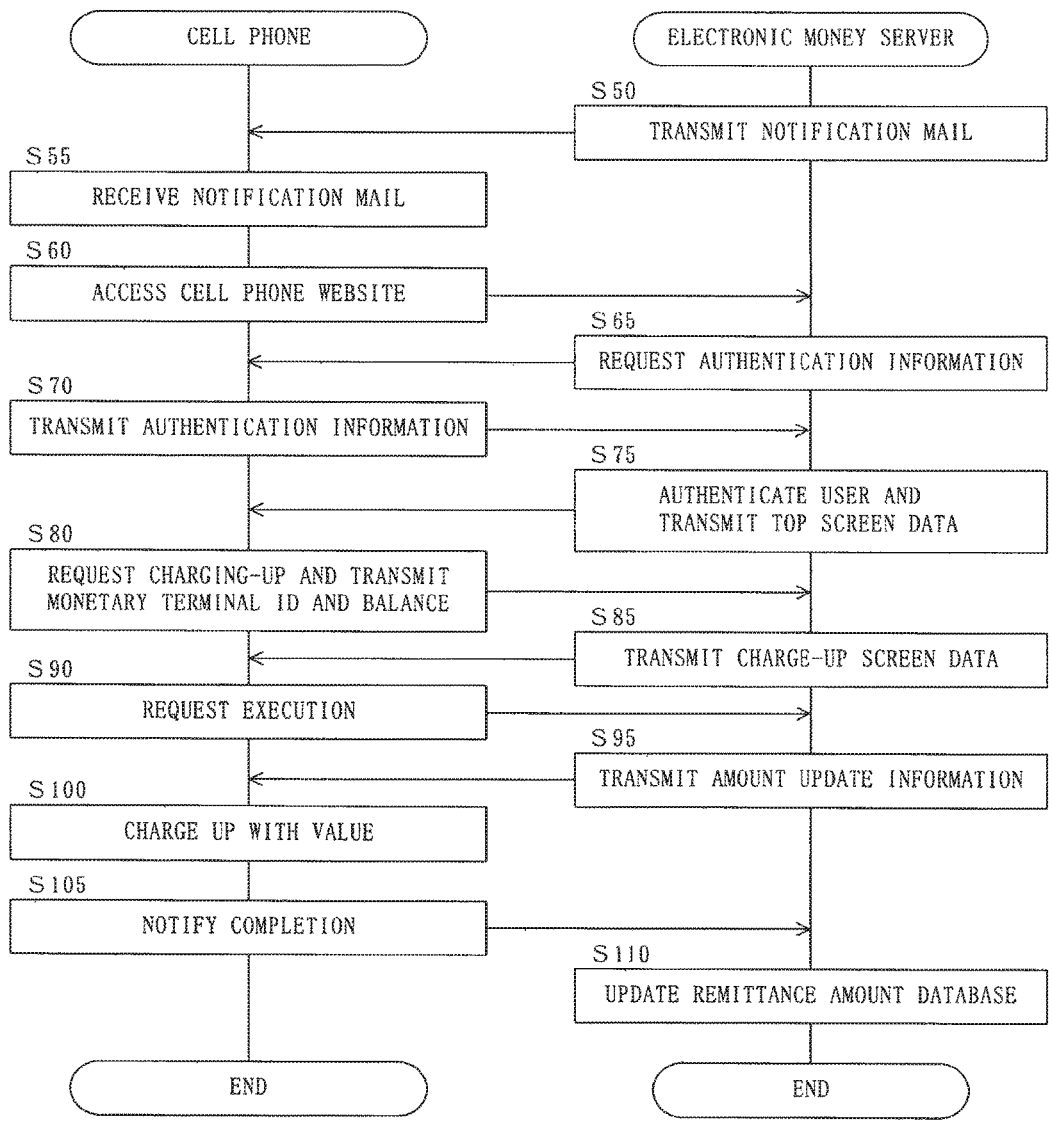
FIG. 10 is a flowchart for explaining a procedure for charging up a monetary terminal with remitted money.

Next, the procedure for charging up the monetary terminal with a remitted amount is described with reference to a flowchart of FIG. 10.

Although the cell phone 7 is used herein as the monetary terminal, a similar procedure is applied to the case of charging up the electronic money card 15.

The electronic money server 2 records remitted money as a charge-up unit to the remittance amount database 54, and thereafter, transmits notification mail from the user information database 53 to an electronic mail address registered by the user (step 50) (herein, it is assumed that an electronic mail address for the cell phone 7 is registered).

The user receives the notification mail on the cell phone 7, and confirms that the money remitted previously has been made available for charging-up (step 55).

Then, the user uses the cell phone 7 to access the cell phone website 32 (FIG. 1) (step 60).

When the user operates the cell phone 7 to access the cell phone website 32, the electronic money server 2 transmits authentication screen data to the cell phone 7 to request user authentication (step 65).

The cell phone 7 receives the authentication screen data from the electronic money server 2, and displays an authentication screen on the display of the cell phone 7 based on the received data.

The authentication screen asks for entering a user ID and a password, and the user enters authentication information, i.e., the ID and the password, using numeric keys, character keys and operating keys on the cell phone 7 and transmits the information to the electronic money server 2 (step 70).

The electronic money server 2 receives the authentication information from the cell phone 7, and checks it against authentication information stored in the user information database 53 to authenticate and identify the user. When the authentication is successful, the electronic money server 2 transmits top screen data to the cell phone 7 (step 75).

Upon receipt of the top screen data from the electronic money server 2, the cell phone 7 displays a top screen on the display based on the top screen data.

The top screen displays a list of services available to the user, and indicates that the remitted money can be used for charging-up.

Then, when the user requests charging-up, the cell phone 7 acquires a monetary terminal ID and the balance of "VALUE" from the electronic money function portion 12, and transmits them to the electronic money server 2 (step 80).

The electronic money server 2 receives (at an amount reception section) the monetary terminal ID and the balance of "VALUE" from the cell phone 7, and checks whether the received monetary terminal ID matches any monetary terminal ID registered in the user information database 53 in order to ensure the security. Thereafter, charge-up screen data is generated based on the amount stored in the remittance amount database 54, and transmitted to the cell phone 7 (step 85).

The cell phone 7 receives the charge-up screen data from the electronic money server 2, and displays a charge-up screen on the display.

FIG. 11 is a diagram illustrating an exemplary charge-up screen.

As shown in the figure, the charge-up screen presents items such as "receivable amount", "current balance of VALUE" and "balance after reception".

The "receivable amount" indicates, along with an expiration date, a charge-up unit available for charging-up stored as remittance amount data in the remittance amount database 54 (FIG. 7).

In the example of the figure, a single charge-up unit such as "¥1,000 (expiration date: 2004/7/7)" is shown, but in the case where the remitted amount is divided into a plurality of charge-up units, they are listed so that the user can select any charge-up unit for use in charging-up.

In addition, the charge-up units may be used in other manners, such as using them in order from closest expiration date, and if there are charge-up units having the same expiration date, they are used in order from smallest amount.

The "current balance of VALUE" indicates the balance of "VALUE" received from the cell phone 7. The "balance after reception" indicates the balance after charging-up is performed. This is obtained by the electronic money server 2 adding the receivable amount to the current balance of "VALUE".

Note that when the balance after reception exceeds an allowable limit for charging-up, the charge-up screen indicates it to notify the user that charging-up is not available.

In addition, when there are charge-up units that, when added, may and may not exceed the allowable limit, an indication as such is provided and any charge-up unit that does not exceed the allowable limit can be selected.

As such, the electronic money server 2 generates and transmits amount update information within the range that does not exceed the allowable limit previously set for the cell phone 7.

Furthermore, the charge-up screen also presents an execute button for executing charging-up, a return button for returning to the previous page and a cancel button for canceling entered content (e.g., selection of a charge-up unit), and the user selects any of them by operating the operating buttons on the cell phone 7.

Referring back to FIG. 10, when the user selects the execute button to request charging-up (step 90), the electronic money server 2 generates amount update information for adding an amount of "VALUE" equivalent to a charge-up unit, and transmits it to the cell phone 7 (step 95).

As such, the electronic money server 2 includes an amount update information transmission section for transmitting to a cell phone 7 identified by a monetary terminal ID, amount update information for increasing "VALUE" by a predetermined amount so as not exceed a remitted amount.

The cell phone 7 receives the amount update information from the electronic money server 2, and inputs it to the electronic money function portion 12 to perform charging-up (step 100).

Upon completion of charging-up, the cell phone 7 transmits a completion notice to the electronic money server 2 (step 105).

Upon receipt of the completion notice from the cell phone 7, the electronic money server 2 confirms success in charging-up, and updates the remittance amount database 54 (step 110).

At this time, the transaction information database 55 is also updated.

As for the remittance amount database 54, charged-up flag information is set for the charge-up unit used for charging-up to record that the charge-up unit has been used.

As such, the electronic money server 2 includes an amount decrease section for setting charged-up flag information to decrease the amount of remitted money by an amount by which to increase "VALUE" based on transmitted amount update information.

As for the transaction information database 55, log data that has been generated when charging-up the cell phone 7 is recorded.

As described above, the monetary terminal can be charged up with "VALUE" in charge-up units stored in the remittance amount database 54.

The present embodiment as described above achieves the following effects:

(1) A monetary terminal can be charged up by remitting a fund to an account in a financial institution such as a bank.

(2) A monetary terminal that is to be charged up can be identified by entering a monetary terminal ID in the remitter field of a remittance screen for the financial institution.

(3) The amount of remitted money can be divided into charge-up units for charging-up.

(4) When the expiration date for the remitted money has reached, the money can be refunded to the user's refund account.

Note that in the present embodiment, when remitting money, the user enters his/her name and a monetary terminal ID as remitter information, but any information can be used as the remitter information so long as a monetary terminal that is to be charged up can be identified, and it is also possible to use only the monetary terminal ID, for example.

Furthermore, it is also possible to enter other information that can identify the monetary terminal ID, rather than entering the monetary terminal ID itself.

For example, the electronic money server 2 stores a character string in association with the monetary terminal ID, and the user enters the character string as the remitter information, instead of entering the monetary terminal ID. The user can set any character string that is readily memorized to reduce the user's burden involved with entering the remitter information.

In addition, it is also possible to provide a destination account for remittance with information for distinguishing the monetary terminal, rather than the remitter information.

In this case, for example, the user is caused to enter information for identifying the monetary terminal after the account number of the center account 31, and the electronic money server 2 identifies, based on this information, the monetary terminal that is to be charged up.

Also, in the present embodiment, the user can perform charging-up in charge-up units, but it is also possible to allow the user to designate an amount that can be used for charging-up.

Specifically, the remittance amount database 54 records a total amount of money remitted to the center account 31, and the user arbitrarily designates the amount that can be used for charging-up within the range of the total amount but not beyond an allowable limit for the monetary terminal.

Then, the electronic money server 2 generates amount update information for adding the designated amount, and transmits it to the monetary terminal, while subtracting the amount used for charging-up from the total amount.

What is claimed is:

1. A monetary information processing server configured to communicate with: (a) a first monetary terminal configured to store a first monetary value; and (b) a financial system including a single first predetermined financial account, the monetary information processing server comprising:
 a processor; and
 a memory device operatively coupled to the processor, the memory device storing instructions which when executed by the processor, cause the processor to:
 (a) acquire, from the financial system:
  (i) an amount, the amount being withdrawn from the single first predetermined financial account; and
  (ii) monetary terminal identification information by a user input;
 (b) in response to the monetary terminal identification information:
  (i) store a first accumulation amount using the amount for the first monetary terminal;
  (ii) in response to the amount exceeding a predetermined amount, divide the amount being withdrawn from the single first predetermined financial account by the predetermined amount into unit amounts, wherein the unit amounts are less than or equal to the predetermined amount;
  (iii) in response to the amount from the financial system being acquired, transmit a transmission preparation completion notice to a destination associated with the first monetary terminal;
  (iv) in response to the transmission preparation completion notice being transmitted to the destination associated with the first monetary terminal, transmit, to the first monetary terminal, first amount update information for increasing the first monetary value stored in the first monetary terminal by a first charge-up amount which is equal to the unit amounts, the first charge-up amount not exceeding the first accumulation amount; and
  (v) decrease the stored first accumulation amount by the first charge-up amount, and store a second accumulation amount as a remaining balance from the amount acquired from the financial system less the first charge-up amount.

2. The monetary information processing server of claim 1, wherein the first monetary terminal includes a cell phone.

3. The monetary information processing server of claim 1, wherein the first monetary terminal includes an IC chip configured to increase or decrease the first monetary value stored in the first monetary terminal.

4. The monetary information processing server of claim 1, wherein the first monetary terminal includes an electronic money card.

5. The monetary information processing server of claim 1, wherein the financial system includes a banking system.

6. The monetary information processing server of claim 1, wherein the destination associated with the first monetary terminal is an electronic mail address.

7. The monetary information processing server of claim 1, the monetary terminal identification information is associated with the first monetary terminal.

8. The monetary information processing server of claim 1, wherein the predetermined amount is equal to one half of the first monetary amount.

9. The monetary information processing server of claim 1, wherein the predetermined amount is less than one half of the first monetary amount.

10. The monetary information processing server of claim 1, further comprising a second monetary terminal including a second cell phone.

11. A non-transitory computer readable storage medium storing instructions which, when executed, cause at least one processor in a monetary information processing server to:
 (a) acquire, from a financial system including a single first predetermined financial account:
  (i) an amount, the amount being withdrawn from the single first predetermined financial account; and
  (ii) monetary terminal identification information by a user input;
 (b) in response to the monetary terminal identification information:
  (i) store a first accumulation amount using the amount for a first monetary terminal, the first monetary terminal is configured to store a first monetary value;
  (ii) in response to the amount exceeding a predetermined amount, divide the amount being withdrawn from the single first predetermined financial account by the predetermined amount into unit amounts, wherein the unit amounts are less than or equal to the predetermined amount;
  (iii) in response to the amount from the financial system being acquired, transmit a transmission preparation completion notice to a destination associated with the first monetary terminal;
  (iv) in response to the transmission preparation completion notice being transmitted to the destination associated with the first monetary terminal, transmit, to the first monetary terminal, first amount update information for increasing the first monetary value stored in the first monetary terminal by a first charge-up amount which is equal to the unit amounts, the first charge-up amount not exceeding the first accumulation amount; and
  (v) decrease the stored first accumulation amount by the first charge-up amount, and store a second accumulation amount as a remaining balance from the amount acquired from the financial system less the first charge-up amount.

12. The non-transitory computer readable storage medium of claim 11, wherein the first monetary terminal includes a cell phone.

13. The non-transitory computer readable storage medium of claim 11, wherein the first monetary terminal includes an IC chip configured to increase or decrease the first monetary value stored in the first monetary terminal.

14. The non-transitory computer readable storage medium of claim 11, wherein the first monetary terminal includes an electronic money card.

15. The non-transitory computer readable storage medium of claim 11, wherein the financial system includes a banking system.

16. The non-transitory computer readable storage medium of claim 11, wherein the destination associated with the first monetary terminal is an electronic mail address.

17. The non-transitory computer readable storage medium of claim 11, the monetary terminal identification information is associated with the first monetary terminal.

18. The non-transitory computer readable storage medium of claim 11, wherein the predetermined amount is equal to one half of the first monetary amount.

19. The non-transitory computer readable storage medium of claim 11, wherein the predetermined amount is less than one half of the first monetary amount.

\* \* \* \* \*